US009825702B2

(12) United States Patent
Cha

(10) Patent No.: US 9,825,702 B2
(45) Date of Patent: Nov. 21, 2017

(54) OLED DISPLAY APPARATUS AND VISIBLE LIGHT COMMUNICATION SYSTEM HAVING THE SAME

(71) Applicant: Seoul National University of Technology Center for Industry Collaboration, Seoul (KR)

(72) Inventor: Jaesang Cha, Seoul (KR)

(73) Assignee: SEOUL NATIONAL UNIVERSITY OF TECHNOLOGY CENTER FOR INDUSTRY COLLABORATION (KR)

( * ) Notice: Subject to any disclaimer, the term of this patent is extended or adjusted under 35 U.S.C. 154(b) by 40 days.

(21) Appl. No.: 14/442,396

(22) PCT Filed: Nov. 11, 2013

(86) PCT No.: PCT/KR2013/010182
§ 371 (c)(1),
(2) Date: May 12, 2015

(87) PCT Pub. No.: WO2014/073922
PCT Pub. Date: May 15, 2014

(65) Prior Publication Data
US 2016/0277106 A1 Sep. 22, 2016

(30) Foreign Application Priority Data
Nov. 12, 2012 (KR) .................. 10-2012-0127206
Oct. 23, 2013 (KR) .................. 10-2013-0126267

(51) Int. Cl.
*H04B 10/00* (2013.01)
*H04B 10/116* (2013.01)
*G09G 3/3208* (2016.01)

(52) U.S. Cl.
CPC ........ *H04B 10/116* (2013.01); *G09G 3/3208* (2013.01); *G09G 2370/18* (2013.01)

(58) Field of Classification Search
CPC .. H04B 10/1149; H04B 10/11; H04B 10/1121
See application file for complete search history.

(56) References Cited

U.S. PATENT DOCUMENTS

2011/0014955 A1* 1/2011 Kim .................. G02F 1/133603
455/566
2011/0261269 A1* 10/2011 Khan .................... G06F 1/1626
348/734

(Continued)

FOREIGN PATENT DOCUMENTS

JP 2009153117 7/2009
KR 20060017940 2/2006

(Continued)

OTHER PUBLICATIONS

English translation of Korean application No. 10-2011-0075486.*

*Primary Examiner* — Tesfaldet Bocure
(74) *Attorney, Agent, or Firm* — Renaissance IP Law Group LLP

(57) ABSTRACT

An OLED display capable of visible light communication and a visible light communication system having same are disclosed. The OLED display comprises an OLED display unit, a data memory unit, and an OLED control unit. The OLED display unit emits an image which is outwardly displayed and additional information which is included in the image. The data memory unit is storing image data corresponding to the image and additional data corresponding to the additional information. The OLED control unit controls the OLED display unit to display the image by using the image data provided by the data memory unit and controls the flicker of the image within a range which cannot be perceived by human eyes so that the additional informa- (Continued)

tion is included in the image by using the additional data provided by the data memory unit. As described above, the OLED display displays not only a general image but also additional information included in the image and thus can perform an image display function together with a reception function in visible light communication.

20 Claims, 2 Drawing Sheets

(56) References Cited

U.S. PATENT DOCUMENTS

| | | | | |
|---|---|---|---|---|
| 2013/0208027 A1* | 8/2013 | Bae | ...................... | G09G 3/3406 |
| | | | | 345/690 |
| 2014/0023378 A1* | 1/2014 | Bae | ........................ | G06Q 30/02 |
| | | | | 398/128 |
| 2015/0310736 A1* | 10/2015 | Yamada | .................. | G08C 17/02 |
| | | | | 398/107 |

FOREIGN PATENT DOCUMENTS

| | | | |
|---|---|---|---|
| KR | 20100067881 | | 6/2010 |
| KR | 10-2011-0075486 | * | 7/2011 |
| KR | 20120063935 | | 6/2012 |

* cited by examiner

[Fig. 1]
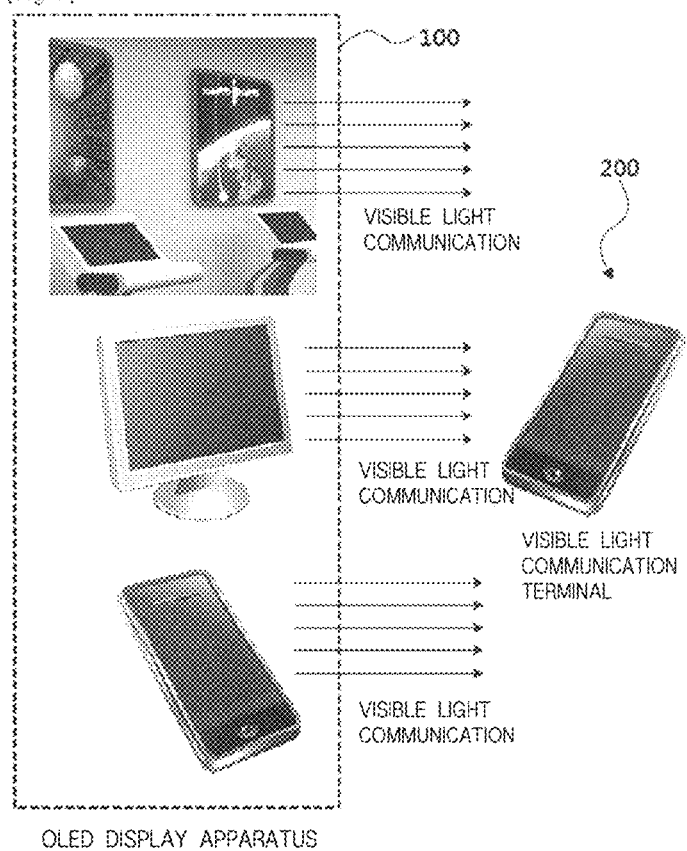
OLED DISPLAY APPARATUS
[Fig. 2]
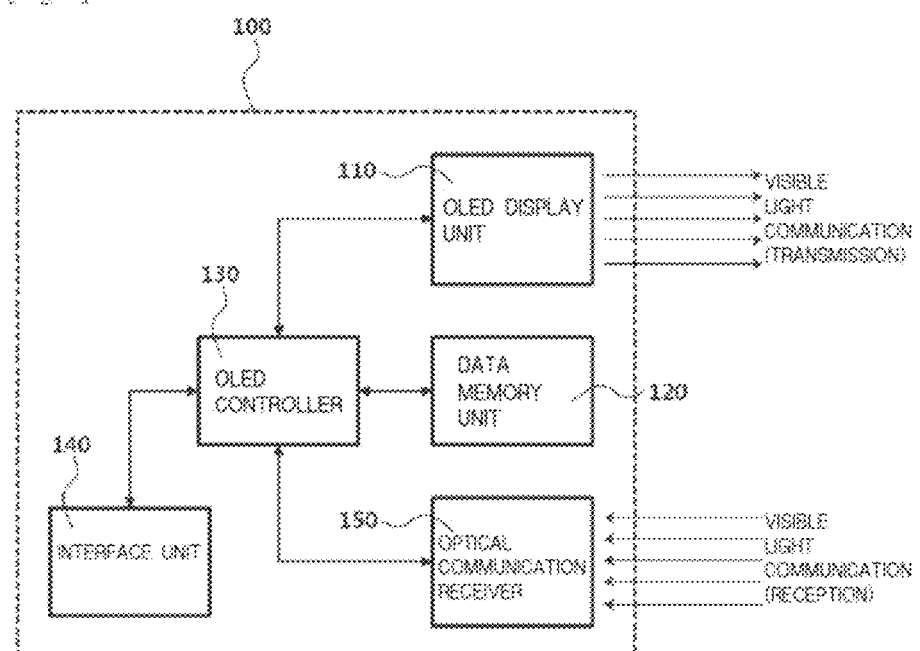

[Fig. 3]
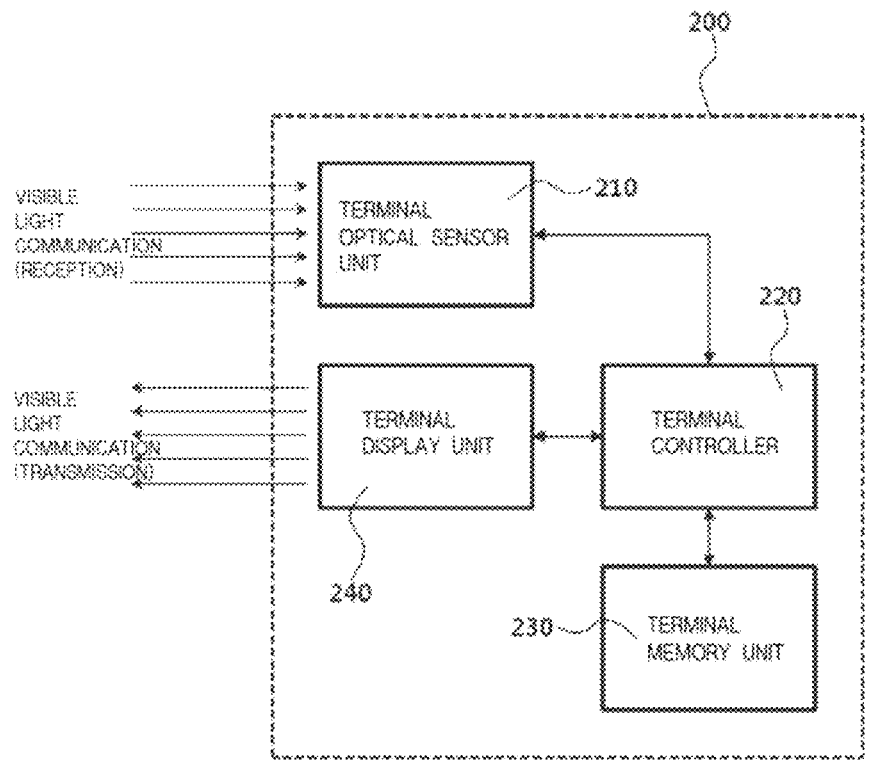
[Fig. 4]
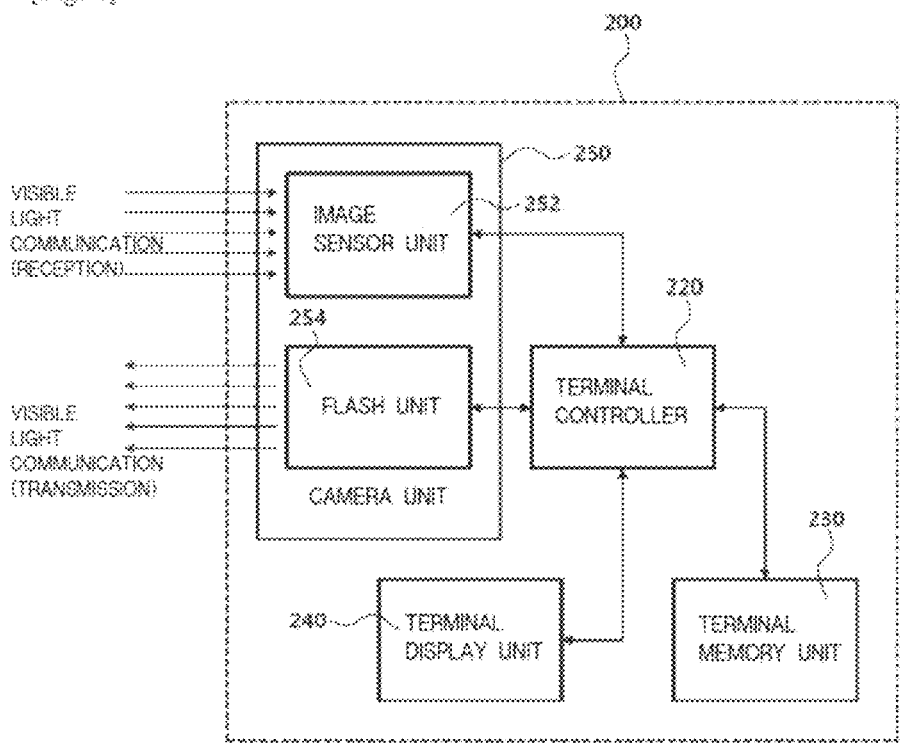

OLED DISPLAY APPARATUS AND VISIBLE LIGHT COMMUNICATION SYSTEM HAVING THE SAME

TECHNICAL FIELD

The present invention relates to an OLED display apparatus and visible light communication system having the same. More particularly, the present invention relates to an OLED display apparatus and visible light communication system to output light in a form for visible light communication.

BACKGROUND ART

Generally, displays for displaying images may include Liquid Crystal Devices (LCDs), electroluminescence display apparatuses, Organic Light Emitting Diode (OLED) display apparatuses, etc. Compared to the other display apparatuses above, the OLED display apparatus may be formed to be lightweight and thin as well as able to be driven with low power and display high-definition images. Accordingly, the OLED display apparatus has been applied to displays for smartphones or monitors, and the applications thereof are expanding.

DISCLOSURE

Technical Problem

Accordingly, the present invention has been made keeping in mind the above problems occurring in the prior art, and an object of the present invention is to provide an Organic Light Emitting Diode (OLED) display apparatus that outputs an image for visible light communication.

Another object of the present invention is to provide a visible light communication system having the OLED display apparatus.

Technical Solution

An Organic Light Emitting Diode (OLED) display apparatus in accordance with an embodiment of the present invention includes an OLED display unit, a data memory unit, and an OLED controller.

The OLED display unit may output an image for external display and additional information included in the image. The data memory unit may store image data that corresponds to the image and additional data that corresponds to the additional information. The OLED controller may use the image data provided from the data memory unit to control the OLED display unit to display the image, and use the additional data provided from the data memory unit to control flickering of the image within a range not recognized by the human eye such that the additional information is included in the image.

The additional information may include location information having a location value for location guidance. The additional information may further include additional information per location individually linked to the location value.

The OLED display apparatus may further include an interface unit connected to an external device wiredly or wirelessly for communication and for receiving update data from the external device to update at least one of the image data and the additional data and forwarding the update data to the OLED controller.

The OLED display apparatus may further include an optical communication receiver for detecting flickering of visible light applied from outside and providing information included in the visible light to the OLED controller.

A visible light communication system in accordance with an embodiment of the present invention includes an Organic Light Emitting Diode (OLED) display apparatus for outputting an image for external display and additional information included in flickering of the image; and a visible light communication terminal for detecting the flickering of the image to recognize the additional information.

The additional information may include location information having a location value of the OLED display apparatus, and additional information per location individually linked to the location value.

The visible light communication terminal may include a terminal optical sensor unit for detecting flickering of the image to extract the additional information from the image; a terminal controller for receiving the additional information and performing data processing on the additional information; a terminal memory unit for storing the additional information under control of the terminal controller; and a terminal display unit for displaying the additional information under control of the terminal controller.

The terminal memory unit may store terminal additional data having terminal additional information for visible light communication, and the terminal controller may use the terminal additional data provided from the terminal memory unit to control flickering of light output from the flash unit such that the terminal additional information is included in the light.

The visible light communication terminal may include a camera unit for detecting flickering of the image to extract the additional information from the image; a terminal controller for receiving the additional information and performing data processing on the additional information; a terminal memory unit for storing the additional information under control of the terminal controller; and a terminal display unit for displaying the additional information under control of the terminal controller.

The camera unit may include an image sensor unit for detecting flickering of the image to extract the additional information from the image; and a flash unit for outputting light for the image sensor unit to capture the image.

The terminal memory unit may store terminal additional data having terminal additional information for visible light communication, and the terminal controller may use the terminal additional data provided from the terminal memory unit to control flickering of light output from the flash unit such that the terminal additional information is included in the light.

Advantageous Effects

According to the OLED display apparatus and visible light communication system, the OLED display apparatus may perform an image display function as well as a transmission function for visible light communication, by displaying not only ordinary images but also additional information in the images.

Moreover, a visible light communication terminal may detect flickering of an image displayed on the OLED display apparatus, extract the additional information included in the image to perform data processing, and externally display the additional information through the terminal display.

The visible light communication terminal may also perform a transmission function for visible light communication through the terminal display, or through a flash unit included in the camera unit.

Furthermore, even in a case the OLED display apparatus includes the transmission function for visible light communication, visible light communication may be conducted between the OLED display apparatus and the visible light communication terminal.

BRIEF DESCRIPTION OF DRAWINGS

FIG. 1 is a conceptual diagram illustrating a visible light communication system, according to an embodiment of the present invention;

FIG. 2 is a block diagram of an Organic Light Emitting Diode (OLED) display apparatus of the visible light communication system of FIG. 1;

FIG. 3 is a block diagram of a visible light communication terminal of the visible light communication system of FIG. 1, according to an embodiment of the present invention; and FIG. 4 is a block diagram of a visible light communication terminal of the visible light communication system of FIG. 1, according to another embodiment of the present invention.

DESORPTION OF PREFERRED EMBODIMENTS

The invention will be described more fully hereinafter with reference to the accompanying drawings, in which illustrative embodiments of the invention are shown.

The invention may, however, be embodied in many different forms and should not be construed as limited to the embodiments set forth herein; rather, these embodiments are provided so that this invention will be thorough and complete, and will fully convey the scope of the invention to those skilled in the art. Like numbers refer to like elements throughout. Terms like 'first', 'second', etc., may be used to indicate various components, but the components should not be restricted by the terms. These terms are only used to distinguish one element, component, region, layer or section from another region, layer or section. A first element, component, region, layer or section could be termed a second element, component, region, layer or section without departing from the teaching of the embodiments of the present invention.

The terminology used herein is for the purpose of describing particular embodiments only and is not intended to limit the invention. It is to be understood that the singular forms "a," "an," and "the" include plural references unless the context clearly dictates otherwise. It will be further understood that the terms "comprises" or "has," when used in this specification, specify the presence of stated features, integers, steps, operations, elements, and/or components, but do not preclude the presence or addition of one or more other features, integers, steps, operations, elements, components, and/or groups thereof.

Embodiments of the present invention will now be described in more detail with reference to accompanying drawings.

FIG. 1 is a conceptual diagram illustrating a visible light communication system, according to an embodiment of the present invention.

Referring to FIG. 1, a visible light communication system in accordance with the embodiment includes an Organic Light Emitting Diode (OLED) display apparatus 100 and a visible light communication terminal 200.

The OLED display apparatus 100 outputs an image for visible light communication. Specifically, the OLED display apparatus 100 outputs an image to be externally displayed as well as additional information for visible light communication. The additional information is included in flickering of the image within a range not recognized by the human eye.

The visible light communication terminal 200 may detect the flickering of an image output from the OLED display apparatus 100 to recognize the additional information included in the flickering of the image, perform data processing on the additional information, and externally display the processed information.

In the embodiment, the OLED display apparatus 100 may be applied in various applications. For example, the OLED display apparatus 100 may be applied to ordinary monitors, laptop displays, televisions, displays in exhibition booths, guidance displays in bus stops or stations, etc. Furthermore, the OLED display apparatus 100 may be a visible light communication terminal capable of both transmission and reception of visible light communication.

The additional information output from the OLED display apparatus 100 may include location information having a current location value of the OLED display apparatus 100, and further include additional information per location individually linked to the location value. For example, assuming that a guidance display to which the OLED display apparatus 100 is applied is deployed on a street, the additional information output from the guidance display may be provided with a current location of the guidance display, and additional information per location of main shops, restaurants, etc. adjacent to the current location.

The OLED display apparatus 100 and the visible light communication terminal 200 will now be described in detail in connection with respective drawings.

FIG. 2 is a block diagram of the OLED display apparatus of the visible light communication system of FIG. 1.

Referring to FIG. 2, the OLED display apparatus 100 includes an OLED display unit 110, a data memory unit 120, an OLED controller 130, and an interface unit 140.

The OLED display unit 110 may include a plurality of OLED elements arranged in the form of a matrix, and output an image for external display and additional information included in flickering of the image.

The data memory unit 120 may store various data required for the OLED display apparatus 100 under control of the OLED controller 130. Specifically, the OLED display unit 110 may store image data that corresponds to an image to be displayed on the OLED display unit 110, and additional data that corresponds to additional information included in the flickering of the image.

The OLED controller 130 may receive the image data from the data memory unit 120, and use the image data to control the OLED display unit 110 to display the image on the OLED display unit 110. The OLED controller 130 may also receive the additional data from the data memory unit 120, and use the additional data to control the flickering of the image within a range not recognized by the human eye, such that the additional information is included in the image.

The interface unit 140 may be connected to the OLED controller 130 for exchanging signals, and wiredly or wirelessly connected to an external device (not shown) for communication. For example, the interface unit 140 may include at least one of an interface unit able to access the external device via a separate cable, and a wireless communication unit connected to the external device for exchanging signals in a wireless communication scheme.

The interface unit 140 may be offered update data from the external device to update at least one of the image data and the additional data, and forward the update data to the OLED controller 130. The OLED controller 130 may then update at least one of the image data and the additional data stored in the data memory unit 120 with the update data.

The OLED display apparatus 100 may perform not only the transmission function of the visible light communication but also the reception function of the visible light communication. In this regard, the OLED display apparatus 100 may further include an optical communication receiver 150 for detecting flickering of visible light applied from outside and providing information included in the visible light to the OLED controller 130.

FIG. 3 is a block diagram of a visible light communication terminal of the visible light communication system of FIG. 1, according to an embodiment of the present invention.

Referring to FIG. 3, the visible light communication terminal 200 may include a terminal optical sensor unit 210, a terminal controller 220, a terminal memory unit 230, and a terminal display unit 240.

The terminal optical sensor unit 210 detects flickering of an image output from the OLED display apparatus 100 and extracts additional information included in the image. In this regard, the terminal optical sensor unit 210 includes an optical communication sensor able to obtain an image at a faster speed than the flickering of the image to detect the flickering of the image.

The terminal controller 220 is offered the additional information from the terminal optical sensor unit 210 and performs data processing on the additional information. The terminal memory unit 230 may store various data required for operation of the visible light communication terminal 200, and store the additional information under control of the terminal controller 220. The terminal display unit 240 may display respective images for the various data under control of the terminal controller, and display the additional information offered from the terminal controller 220.

The terminal display unit 240 may not only simply display an image but also perform the transmission function for visible light communication.

Specifically, for example, the terminal memory unit 230 may store terminal additional information for visible light communication, i.e., terminal additional data including various information for transmission. The terminal controller 220 may receive the terminal additional data from the terminal memory unit 230, and control the flickering of a terminal image within a range not recognized by the human eye, such that the terminal additional information included in the terminal additional data is included in the terminal image displayed on the terminal display unit 240.

FIG. 4 is a block diagram of a visible light communication terminal of the visible light communication system of FIG. 1, according to another embodiment of the present invention.

Referring to FIG. 4, the visible light communication terminal 200 may include a terminal controller 220, a terminal memory unit 230, a terminal display unit 240, and a camera unit 250. The terminal controller 220, terminal memory unit 230 and terminal display unit 240 are substantially the same as those described in connection with FIG. 3, and thus the detailed description will be omitted herein.

The camera unit 250 detects flickering of an image output from the OLED display apparatus 100 and extracts additional information included in the image. Specifically, the camera unit 250 may include an image sensor unit 252 for detecting the flickering of the image and extracting the additional information included in the image, and a flash unit 254 for outputting light for the image sensor unit 252 to capture the image. In this regard, the image sensor unit 252 includes a plurality of image sensors, e.g., Complementary Metal-Oxide Semiconductor (CMOS) sensors that are able to obtain an image at a faster speed than the flickering of the image, in order to detect the flickering of the image.

The flash unit 254 may not only simply irradiate light but also perform the transmission function for visible light communication.

Specifically, for example, the terminal memory unit 230 may store terminal additional information for visible light communication, i.e., terminal additional data including various information for transmission. The terminal controller 220 may receive the terminal additional data from the terminal memory unit 230, and control the flickering of flash light within a range not recognized by the human eye, such that the terminal additional information included in the terminal additional data is included in the flash light output from the flash unit 254.

According to the embodiments of the present invention, the OLED display apparatus 100 may perform an image display function as well as a transmission function for visible light communication, by displaying not only ordinary images but also controlling flickering of the image to display additional information contained in the image.

Moreover, a visible light communication terminal 200 may detect flickering of an image displayed on the OLED display apparatus 100, extract the additional information included in the image and perform data processing on the additional information, and externally display the additional information on the terminal display unit 240.

The visible light communication terminal 200 may also perform the transmission function for visible light communication through the terminal display unit 240, or through the flash unit 254 contained in the camera unit 250.

Furthermore, even in a case where the OLED display apparatus 100 includes the transmission function for visible light communication, visible light communication may be conducted between the OLED display apparatus 100 and the visible light communication terminal 200.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:
1. An OLED display apparatus comprising:
  an OLED display unit for outputting an image for external display and additional information included in the image;
  a data memory unit for storing image data that corresponds to the image and additional data that corresponds to the additional information; and
  an OLED controller for using the image data provided from the data memory unit to control the OLED display unit to display the image on the OLED display unit, and using the additional data provided from the data memory unit to control flickering of the image within a range not recognized by the human eye such that the additional information is included in the image.
2. The OLED display apparatus of claim 1, wherein the additional information includes location information having a location value for location guidance.

3. The OLED display apparatus of claim 1, wherein the additional information further includes additional information per location individually linked to the location value.

4. The OLED display apparatus of claim 1, further comprising: an interface unit connected to an external device wiredly or wirelessly for communication and for receiving update data from the external device to update at least one of the image data and the additional data and forwarding the update data to the OLED controller.

5. The OLED display apparatus of claim 1, further comprising: an optical communication receiver for detecting flickering of visible light applied from outside and providing information included in the visible light to the OLED controller.

6. A visible light communication system comprising:
an OLED display apparatus for outputting an image for external display and additional information included in flickering of the image; and
a visible light communication terminal for detecting the flickering of the image to recognize the additional information.

7. The visible light communication system of claim 6, wherein the additional information includes location information having a location value of the OLED display apparatus; and additional information per location individually linked to the location value.

8. The visible light communication system of claim 6, wherein the visible light communication terminal comprises a terminal optical sensor unit for detecting flickering of the image to extract the additional information from the image; a terminal controller for receiving the additional information and performing data processing on the additional information; a terminal memory unit for storing the additional information under control of the terminal controller; and a terminal display unit for displaying the additional information under control of the terminal controller.

9. The visible light communication system of claim 8, wherein the terminal memory unit stores terminal additional data having terminal additional information for visible light communication, and wherein the terminal controller uses the terminal additional data provided from the terminal memory unit to control flickering of a terminal image to be displayed on the terminal display unit within a range not recognized by the human eye such that the terminal additional information is included in the terminal image.

10. The visible light communication system of claim 6, wherein the visible light communication terminal comprises a camera unit for detecting flickering of the image to extract the additional information from the image; a terminal controller for receiving the additional information and performing data processing on the additional information; a terminal memory unit for storing the additional information under control of the terminal controller; and a terminal display unit for displaying the additional information under control of the terminal controller.

11. The visible light communication system of claim 10, wherein the camera unit comprises an image sensor unit for detecting flickering of the image to extract the additional information from the image; and a flash unit for outputting light for the image sensor unit to capture the image.

12. The visible light communication system of claim 11, wherein:
the terminal memory unit stores terminal additional data having terminal additional information for visible light communication, and
the terminal controller uses the terminal additional data provided from the terminal memory unit to control flickering of light output from the flash unit such that the terminal additional information is included in the light.

13. A visible light communication terminal comprising:
a camera unit for detecting flickering of visible light applied from an external device to extract additional information from the visible light;
a terminal controller for receiving the additional information and performing data processing on the additional information;
a terminal memory unit for storing the additional information under control of the terminal controller; and
a terminal display unit for displaying the additional information under control of the terminal controller.

14. The visible light communication terminal of claim 13, wherein the camera unit comprises an image sensor unit for detecting flickering of the visible light to extract the additional information from the visible light; and a flash unit for outputting light for the image sensor unit to capture the image.

15. The visible light communication terminal of claim 14, wherein the terminal memory unit stores terminal additional data having terminal additional information for visible light communication, and wherein the terminal controller receives the terminal additional data from the terminal memory unit and controls flickering of light output from the flash unit such that the terminal additional information is included in the light.

16. The visible light communication terminal of claim 14, wherein the image sensor unit includes a plurality of CMOS sensors able to obtain an image at a faster speed than the flickering of the visible light in order to detect the flickering of the visible light.

17. The visible light communication terminal of claim 13, wherein the terminal memory unit stores terminal additional data having terminal additional information for visible light communication, and wherein the terminal controller receives the terminal additional data from the terminal memory unit and controls flickering of the terminal image such that the terminal additional information is included in the terminal image.

18. The visible light communication terminal of claim 17, wherein the terminal image flickers within a range not recognized by the human eye.

19. The visible light communication terminal of claim 13, wherein the additional information includes location information having a location value of the external device; and additional information per location individually linked to the location value.

20. A visible light communication terminal comprising:
a terminal optical sensor unit for detecting flickering of visible light applied from an external device to extract additional information included in the visible light;
a terminal controller for receiving the additional information and performing data processing on the additional information;
a terminal memory unit for storing the additional information under control of the terminal controller; and
a terminal display unit for displaying the additional information under control of the terminal controller.

* * * * *